(12) United States Patent
Kuhnle et al.

(10) Patent No.: US 12,333,601 B2
(45) Date of Patent: Jun. 17, 2025

(54) SYSTEMS AND METHODS FOR DYNAMIC PRICING OF COLLECTIVE INVESTMENT VEHICLES

(71) Applicant: D12 Ventures, LLC, Bedminster, NJ (US)

(72) Inventors: Paul Edward Kuhnle, Doylestown, PA (US); Daniel Joseph McCabe, Upper Saddle River, NJ (US); Mark Steven Criscitello, Colts Neck, NJ (US); John Stuart Thomas, Morristown, NJ (US)

(73) Assignee: D12 Ventures, LLC, Bedminster, NJ (US)

( * ) Notice: Subject to any disclaimer, the term of this patent is extended or adjusted under 35 U.S.C. 154(b) by 0 days.

(21) Appl. No.: 16/196,560

(22) Filed: Nov. 20, 2018

(65) Prior Publication Data

US 2019/0156419 A1 May 23, 2019

Related U.S. Application Data

(60) Provisional application No. 62/590,151, filed on Nov. 22, 2017.

(51) Int. Cl.
*G06Q 40/04* (2012.01)
*G06Q 30/0201* (2023.01)
*G06Q 40/06* (2012.01)

(52) U.S. Cl.
CPC ......... *G06Q 40/04* (2013.01); *G06Q 30/0206* (2013.01); *G06Q 40/06* (2013.01)

(58) Field of Classification Search
None
See application file for complete search history.

(56) References Cited

U.S. PATENT DOCUMENTS

| | | |
|---|---|---|
| 4,722,055 A | 1/1988 | Roberts |
| 6,263,321 B1 | 7/2001 | Daughtery, III |
| H2064 H | 5/2003 | Buchalter |
| 7,099,838 B1 | 8/2006 | Gastineau et al. |
| 7,461,027 B1 | 12/2008 | Volpert |
| 7,496,531 B1 | 2/2009 | Gastineau et al. |
| (Continued) | | |

FOREIGN PATENT DOCUMENTS

WO 2014078945 A1 5/2014

OTHER PUBLICATIONS

On The Right Track: Measuring Tracking Efficiency in ETFs, Morning Star Reports (Year: 2013).*

(Continued)

*Primary Examiner* — David P Sharvin
(74) *Attorney, Agent, or Firm* — Fish & Richardson P.C.

(57) ABSTRACT

Disclosed herein are methods and systems for dynamic pricing of collective investment vehicles (CIVs). Portfolio composition data that identifies a plurality of portfolio securities of a CIV is received at a pricing server. Pricing data is obtained at the pricing server. A market-dynamic security price is determined at the pricing server for each portfolio security of the plurality of portfolio securities. The market-dynamic security price is dependent at least in part upon market-feed metrics determined from the pricing data. Based on the determined market-dynamic prices, an indicative value of a CIV share is generated at the pricing server. The indicative value of the CIV share is transmitted for publication.

16 Claims, 8 Drawing Sheets

(56) References Cited

U.S. PATENT DOCUMENTS

| | | |
|---|---|---|
| 7,636,681 B2 | 12/2009 | Margolis et al. |
| 7,739,186 B1 | 6/2010 | Gerber |
| 7,778,908 B1 | 8/2010 | Grumet |
| 7,805,350 B2 | 9/2010 | Kalotay |
| 7,813,987 B1 | 10/2010 | Kuhnle |
| 7,835,968 B1 | 11/2010 | Virkki |
| 7,917,429 B2 | 3/2011 | Weber et al. |
| 7,925,562 B2 | 4/2011 | Kuhnle et al. |
| 8,301,541 B1 | 10/2012 | Monroe et al. |
| 8,352,340 B2 | 1/2013 | White et al. |
| 8,396,769 B1 | 3/2013 | Selig et al. |
| 10,102,573 B1 | 10/2018 | Faust |
| 2002/0116314 A1 | 8/2002 | Spencer et al. |
| 2003/0009406 A1 | 1/2003 | Ross |
| 2003/0083972 A1 | 5/2003 | Williams |
| 2003/0120568 A1 | 6/2003 | Chacko et al. |
| 2003/0135446 A1 | 7/2003 | Birle et al. |
| 2003/0139990 A1 | 7/2003 | Greco |
| 2003/0163400 A1 | 8/2003 | Ross et al. |
| 2003/0182220 A1 | 9/2003 | Galant |
| 2003/0200167 A1* | 10/2003 | Kemp, II ............... G06Q 40/06 705/37 |
| 2004/0034587 A1 | 2/2004 | Amberson et al. |
| 2004/0098327 A1 | 5/2004 | Seaman |
| 2004/0133494 A1 | 7/2004 | Jones et al. |
| 2004/0220872 A1 | 11/2004 | Pollock |
| 2004/0236671 A1 | 11/2004 | Woodruff et al. |
| 2005/0015321 A1 | 1/2005 | Vindekilde |
| 2005/0228741 A1* | 10/2005 | Leibowitz ............. G06Q 40/06 705/37 |
| 2006/0224494 A1 | 10/2006 | Pinkava |
| 2006/0265302 A1 | 11/2006 | Schmalenberger et al. |
| 2007/0106588 A1 | 5/2007 | Kulak |
| 2007/0208651 A1 | 9/2007 | Noel |
| 2007/0250330 A1 | 10/2007 | Chen et al. |
| 2008/0201270 A1 | 8/2008 | Marlowe-Noren |
| 2008/0243622 A1 | 10/2008 | Fraser et al. |
| 2008/0288387 A1 | 11/2008 | Meyerhoff |
| 2009/0048962 A1 | 2/2009 | Harrington et al. |
| 2009/0048985 A1* | 2/2009 | Kuhnle ............. G06Q 30/0283 705/400 |
| 2009/0063366 A1 | 3/2009 | Friedman et al. |
| 2009/0083196 A1 | 3/2009 | Volpert |
| 2009/0217183 A1 | 8/2009 | Moyne et al. |
| 2010/0023436 A1 | 1/2010 | Weild, IV |
| 2010/0145875 A1 | 6/2010 | Schmid et al. |
| 2010/0174664 A1 | 7/2010 | Kelly et al. |
| 2010/0198716 A1 | 8/2010 | Chatzky et al. |
| 2010/0235302 A1* | 9/2010 | Ebersole ............... G06Q 40/04 705/37 |
| 2011/0022539 A1* | 1/2011 | Joenk ................... G06Q 40/00 705/36 R |
| 2011/0131065 A1 | 6/2011 | Butcher, III et al. |
| 2011/0320330 A1 | 12/2011 | Recupero |
| 2012/0143740 A1* | 6/2012 | Lopez De Prado ... G06Q 40/04 705/37 |
| 2012/0143742 A1* | 6/2012 | Doherty ................ G06Q 40/04 705/37 |
| 2012/0271746 A1 | 10/2012 | Sandor et al. |
| 2014/0078945 A1 | 3/2014 | Schwartz et al. |
| 2014/0279367 A1* | 9/2014 | Srivastava ............ G06Q 40/04 705/37 |
| 2016/0189295 A1* | 6/2016 | Jang ...................... G06Q 40/04 705/37 |
| 2018/0114269 A1* | 4/2018 | Kuck .................. G07F 17/3295 |
| 2018/0300814 A1 | 10/2018 | McCabe et al. |

OTHER PUBLICATIONS

Dubois, R., Asset price trend theory: Reframing portfolio theory from the ground up, The Journal of Wealth Management, 16(3), 11-30,6 (Year: 2013).*

Maxey, Daisy; "Fidelity Plans Non-Transparent Exchange-Traded Product—Update." Dow Jones Institutional News, Aug. 11, 2016, ProQuest. Web. Feb. 20, 2019 . (3 pages).

Maxey, Daisy. "Fidelity Plans Non-Transparent Exchange-Traded Product; in a Filing, Investment Firm Says it is Seeking Approval to Modernize Traditional Closed-End Fund Structure." Wall Street Journal (Online), Aug. 11, 2016, ProQuest. Web. Feb. 20, 2019 . (4 pages).

A Brief History of the Mutual Fund, McWhinney, J.E., Investopedia, Updated Feb. 6, 2018, 5 pages.

Federal Register, FDIC 12 CFR Part 370 Temporary Liquidity Guarantee Program, Final Rule, pp. 72244-72273, Nov. 26, 2008.

Glossary of Municipal Securities Terms [online], "Redemption and Tender," 2013, retrieved Apr. 18, 2022, retrieved from URL <https://www.msrb.org/glossary>, 4 pages.

Institutional Financial Markets, Inc., S-4 A, Exhibit 10, Jun. 1, 2009, 66 pages.

MT Topics [online], "IAS 32 (revised)—Financial Instruments: Presentation and IAS 1 (revised) Presentation of Financial Statements," Dec. 31, 2015, 2 pages.

Short-Term Borrowings and Long-Term Debt, Toshiba, 1995, 3 pages.

Stallman, "Convertible Bonds," Teen Analyst, Mar. 10, 2009, 2 pages.

* cited by examiner

SYSTEMS AND METHODS FOR DYNAMIC PRICING OF COLLECTIVE INVESTMENT VEHICLES

CROSS-REFERENCE TO RELATED APPLICATIONS

The present application is a non-provisional filing of, and claims benefit under 35 U.S.C. § 119(e) from, U.S. Provisional Patent Application No. 62/590,151 entitled "SYSTEMS AND METHODS FOR DYNAMIC PRICING OF COLLECTIVE INVESTMENT VEHICLES", filed Nov. 22, 2017, which is hereby incorporated by reference in its entirety.

BACKGROUND

Exchange Traded Funds (ETFs) are a type of collective investment vehicle that owns a portfolio of securities and issues shares that are traded on a stock exchange or other organized market. Shares of an ETF are typically created by authorized participants (APs) by either delivering cash or a portfolio of securities or a combination of cash and securities to the ETF and receiving ETF shares in return. ETF shares may also be redeemed by APs by delivering ETF shares and receiving cash, portfolio securities or a combination thereof. Usually, only an AP may create or redeem ETF shares. All other investors buy or sell ETF shares in an organized market.

All ETFs must be approved for issuance by the Securities and Exchange Commission (SEC). Many SEC-approved ETFs attempt to replicate the performance of a benchmark index. Other SEC-approved ETFs are ETFs that are managed without reference to an index. An ETF that is managed without reference to an index is called an actively managed ETF (AM-ETF). To date, all SEC-approved AM-ETFs are transparent, meaning the holdings of the fund must be disclosed daily. The SEC has not yet approved an AM-ETF that is non-transparent.

In order to approve an ETF for issuance, the SEC has required that the market trading the ETF disseminate an indicative value of the ETF shares every 15 seconds during trading hours. Moreover, the SEC requires that any ETF that may be created by delivery of portfolio securities or redeemed in exchange for receipt of portfolio securities publish the holdings of the fund every day, or in other words, for the fund to be transparent. These two requirements have impeded the ability of ETF sponsors to create an actively managed ETF (AM-ETF).

Some managed ETFs have been proposed based on securities other than equity securities. These ETFs comprise mainly fixed income obligations, and do not include common stocks, preferred stocks, warrants, or other equity securities. By restricting the portfolio securities to fixed income/debt securities, the importance of maintaining the confidentiality of the identity of the portfolio securities is decreased. That is, because these types of securities are quite fungible, and alternative equivalent securities are readily identifiable, there is little or no risk that the pricing of the portfolio securities will be affected by disclosure of their identity.

In contrast, managed ETFs that focus primarily on equity securities remain impractical due to the risk that public disclosure of the specific equity securities in the fund portfolio may provide an indication of the ETF manager's investment strategy, thereby allowing the public to take on anticipatory positions in those specific securities (e.g. front running or freeloading). Front running is the practice of traders anticipating future trades in a security by another trader or institution and engaging in the trades before the other trader/institution. Freeloading is having investors trading securities in accordance with a fund manager based on published trading information of a fund. Thus, the investor takes advantage of the fund manager's expertise, however, the fund receives no benefit, such as transaction or management fees from a potential new investor in the fund.

Thus, some actively managed ETFs (AM-ETFs) have a custodian or trustee that interacts with the authorized participants. The custodian/trustee has knowledge of the specific equity securities in the fund portfolio but keeps such information confidential and does not disclose the information to the APs in particular, and to the public in general, which may assist in preventing APs and the public from having opportunities for front running or free-riding off of the AM-ETF investment practices or strategies. Hence, transactions between the AM-ETF and the AP are typically performed in cash-for-AM-ETF-shares exchanges that are facilitated by the AM-ETF trustee. That is, the AP provides cash to the AM-ETF trustee and the AM-ETF trustee provides the AP with AM-ETF shares. Alternatively, the AP may redeem AM-ETF shares to the AM-ETF trustee who then provides cash in exchange. The AP does not receive underlying securities of the AM-ETF as may be the case when an AP interacts with other types of ETFs (e.g. ETF shares may be exchanged for a combination of cash and underlying securities of the ETF).

However, even if the AP and the public are not directly provided with the specific equity holdings of the AM-ETF, confidentiality of the AM-ETF's holdings and manager's investment strategy may still be compromised. Therefore, these prior efforts remain deficient.

OVERVIEW OF CERTAIN DISCLOSED EMBODIMENTS

Disclosed herein are systems and methods for dynamic pricing of collective investment vehicles.

One embodiment takes the form of a method that includes receiving, at a pricing server portfolio-composition data that identifies a plurality of portfolio securities of a collective investment vehicle (CIV). The method also includes obtaining, at the pricing server, pricing data. The method also includes determining, at the pricing server, a market-dynamic security price for each portfolio security of the plurality of portfolio securities, wherein the market-dynamic security price is dependent at least in part upon market-feed metrics determined from the pricing data. The method also includes generating, at the pricing server, an indicative value of a CIV share based on the determined market-dynamic prices. The method also includes transmitting the indicative value of the CIV share for publication.

Moreover, any of the variations and permutations described above and/or anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and/or characterize such embodiments.

Furthermore, the above-listed overview of disclosed embodiments is meant to be illustrative and is not meant to be exhaustive, comprehensive, or otherwise limiting. Those of skill in the relevant art will understand this and will further understand that variations and modifications of the above-listed embodiments, and indeed of any of the disclosed embodiments, can be made without departing from the spirit or scope of the present disclosure.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment . . . ." And it is for reasons akin to brevity and clarity of presentation that this implied leading clause is not repeated ad nauseum in the below detailed description of the drawings.

DETAILED DESCRIPTION

Figure 1:
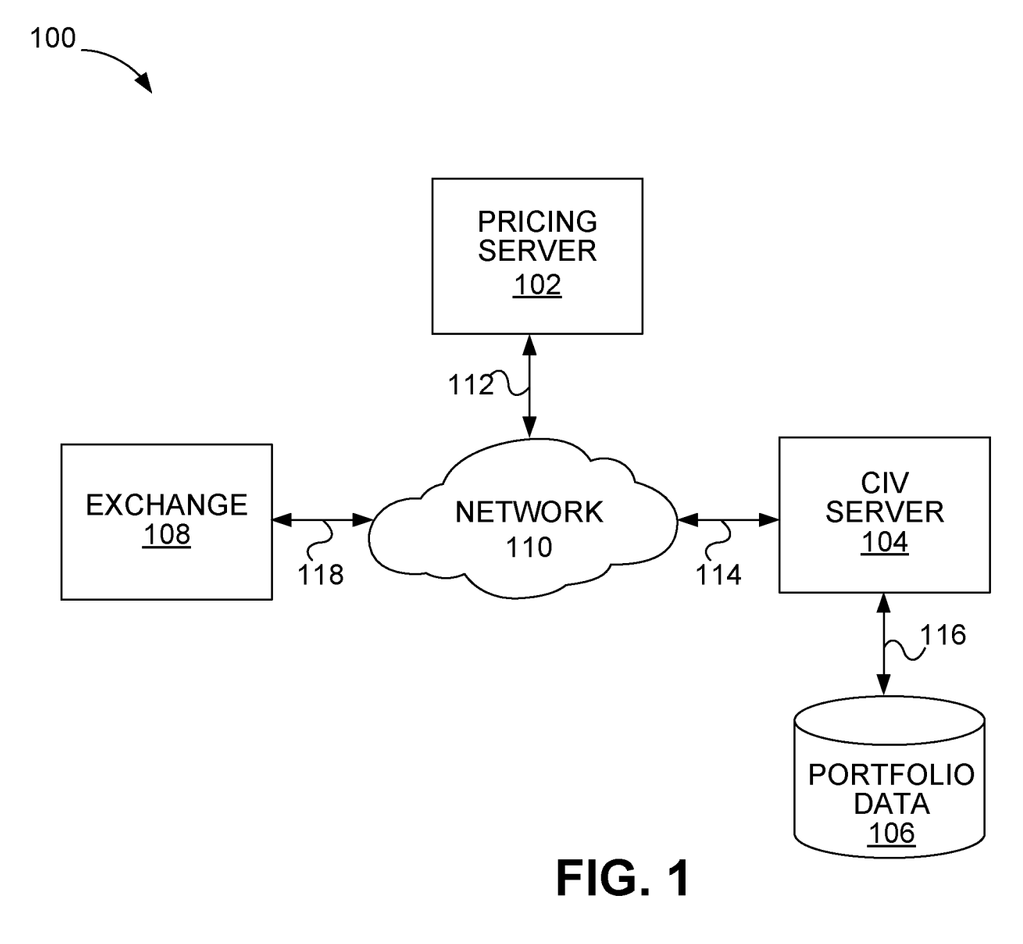
FIG. 1 depicts an example system for dynamic pricing of a collective investment vehicle (CIV), in accordance with at least one embodiment.

FIG. 1 depicts an example system for dynamic pricing of a collective investment vehicle (CIV). In at least one embodiment, the CIV is an actively-managed exchange traded fund (AM-ETF).

System 100 includes a pricing server 102, a CIV server 104, portfolio database 106, an exchange 108, and network 110. At least some of the various components of the system 100 communicate with each other via the network 110 and one or more of data links 112, 114, 116 and/or 118.

The network 110 may be one or more public networks, one or more private networks, one or more virtual private networks (VPNs), the Internet, private communication means such as leased data lines, one or more packet-data networks, one or more radio access networks (RANs), one or more core networks, one or more public switched telephone networks (PTSNs), one or more proprietary connections, and/or any other suitable network(s).

Entities that communicate via the network 110 may do so using one or more protocols, such as for example, the Transport Control Protocol/Internet Protocol (TCP/IP) suite of protocols, HyperText Transport Protocol (HTTP) and associated security protocols HTTPS, and/or any other suitable networking and/or communication protocols as known to one having skill in the art.

The data links 112, 114, 116 and 118 could include one or more wired links, one or more wireless links, one or more networks, one or more access points, one or more routers, switches, bridges, computers, etc.

ETFs are funds that trade like individual securities, for example, on an exchange. One aspect of an ETF is the calculation and reporting of the intraday indicative value, or IIV. The IIV is also sometimes known as the indicative optimized portfolio value (IOPV), the indicative net asset value (iNAV) or the intraday valuation. The IIV is usually calculated independently of the actual trading price of the ETF in the secondary market place, although these two values may exist in parity with one another.

Generally, the IIV is an estimated value for the actual trading value of an ETF during the trading day and is calculated and disseminated to give an investor a per share ETF price that is close to what the intraday net asset value would be, if it were calculated. The IIV is typically calculated and disseminated at intervals throughout the trading day (e.g., at 15 second intervals during the trading day), while an official net asset value (NAV) is typically calculated daily at the end of the trading day. At the end of the trading day, the IIV and the NAV should be close.

Official NAV calculations that are disseminated to the general media after the close of trading on a current trading day (T) are based on the position of the fund at the close of the prior trading day (T−1). The IIV is calculated throughout a current trading day (T) based on the position of the fund at the close of the prior trading day (T−1), but unlike the NAV which is typically based at least in part on the closing prices for the securities in the fund (closing prices of the fund on T−1), the IIV is calculated throughout the current trading day (T) based at least in part on market prices from the current trading day (T) for the underlying securities of the ETF.

In at least one embodiment, the CIV associated with CIV server 104 is an AM-ETF where an ETF manager engages in transactions in the market to alter the contents or holdings of the ETF, as reflected in the portfolio database 106. The ETF manager may also, or alternatively, alter the holdings of the ETF through one or more creation and redemption events as described in U.S. Pat. No. 7,813,987 entitled "Actively Managed Exchange Traded Fund Using AP Representatives for Creation and Redemption," issued Oct. 12, 2010, the contents of which are hereby incorporated by reference.

An ETF manager may manage the AM-ETF using proprietary investment strategies or a proprietary "alpha" generation module. However, there is a concern of a non-trusted entity being able to reverse engineering the underlying portfolio of an ETF (or other CIV) from the published indicative value. A non-trusted entity being able to reverse engineer the underlying portfolio of an AM-ETF, specifically a non-transparent ETF (e.g., an ETF that does not publicly disclose all of its portfolio securities), may harm the ETF. As a specific example, such reverse engineering may allow for other investors and/or managers to dilute an ETF manager's added value by determining the ETF manager's investment strategy, or in other words, the ETF may be vulnerable to "front running" and "free riding" by other investors and/or managers. Such "front running" and "free riding" can harm the ETF in various way (e.g., financially). The ETF may benefit from being able to reduce or eliminate the possibility of reverse engineering the underlying portfolio of the ETF from the published IIV and the subsequent "front running" and/or "free riding" that may result.

Systems and methods described herein may be employed to dynamically price collective investment vehicles. Such dynamic pricing may reduce the ability of non-trusted entities from reverse engineering the holdings of the CIV, thereby helping protect the CIV manager's investment strategy, and more generally the CIV. The pricing may be dynamic since, for a particular pricing interval, a price of each underlying security and/or an IIV may be dynamically determined.

In at least one embodiment, the CIV server 104 provides portfolio-composition data to the pricing server 102. The portfolio-composition data that is provided to the pricing server 102 may identify a plurality portfolio securities of the CIV. In at least one embodiment, the portfolio-composition data includes security identifiers and corresponding quantity information. In at least one embodiment, the collective investment vehicle securities are in the form of shares. The collective investment vehicle securities may alternatively or additionally be bonds and/or notes, or other suitable instruments, such as for example, commodities, currencies derivatives, or instruments based upon any of the foregoing instruments.

In the embodiment depicted in FIG. 1, the CIV server 104 is communicatively coupled to the portfolio database 106. The portfolio database 106 may store the portfolio-composition data and/or other data. In at least one embodiment, the portfolio-composition data stored in the portfolio database 106 is not disclosed to the public. For example, some, or all, of the portfolio-composition data may be confidential to one or more individuals/entities of the CIV, a pricing agent, and/or any individuals/entities required by law to know such information. In at least one embodiment, confidentiality of the constituent components of the CIV is absolute or a portion less than all of the constituent components could be revealed at some time.

In at least one embodiment, the exchange 108 provides a pricing data feed to the pricing server 102. Additionally, or alternatively, a quote service or quote vender may be used to gather pricing data from the exchange 108 (and/or one or more other exchanges) and provide quote and trade data to the pricing server 102.

In at least one embodiment, the pricing server 102 is configured to determine a market-dynamic security price for each portfolio security of the plurality of portfolio securities. The market-dynamic security price may be dependent, at least in part, upon one or more market-feed metrics determined from the pricing data, for example, that is received from the exchange 108.

The pricing server 102 may be configured, for example, to analyze at least some of the pricing data to determine the one or more market-feed metrics. The pricing server 102 may be configured to determine a market-dynamic security price for a portfolio security in a first manner if the determined one or more market feed metrics meet a first set of one or more conditions and/or may be configured to determine a market-dynamic security price for the portfolio security in a second manner if the determined one or more market feed metrics meet a second set of one or more conditions.

One example market-feed metric that may be determined from the pricing data is trading movement. Trading movement may include trading volume, trading velocity, and/or trading frequency. In at least one embodiment, a trading volume is determined from the pricing data for each of the portfolio securities of the plurality of portfolio securities. Each respective determined trading volume may be used to determine a market-dynamic security price for a corresponding security of the plurality of securities. For example, determining a market-dynamic security price for a security may be dependent on a trading-volume event, which may be whether a trading volume (e.g., for one or more securities that may or may not be part of the ETF) has increased, decreased, stayed constant, increased to/above a threshold, and/or decreased to/below a threshold, among numerous other possibilities.

For example, for a CIV having four securities, such as four stocks having symbols AAAA, BBBB, CCCC, and DDDD and trading volumes of 50 trades, 20 trades, 100 trades, and 40 trades, respectively (for a given time period T), may be determined from the pricing data. Each determined trading volume may be used by the pricing server 102 to determine a market-dynamic security price for the corresponding stock, for example, by being compared to a threshold trading volume. The outcome of the comparison may, for example, dictate which subset of the pricing data that the pricing server 102 uses to determine the market-dynamic security price.

If, for example, the threshold trading volume is 60 trades, a comparison between the determined trading volume of stock AAAA (50 trades) and the trading volume threshold (60 trades) indicates that the determined trading volume does not exceed the threshold trading volume. In such an example scenario, because the determined trading volume did not exceed the threshold trading volume, the pricing server 102 may be configured to determine the market-dynamic security price for stock AAAA from a particular subset of the pricing data. For example, if the determined trading volume did not exceed the threshold trading volume, the pricing server 102 may be configured to determine the market-dynamic security price for stock AAAA as/from the last actual trade price for stock AAAA from the pricing data.

If the determined trading volume did exceed the threshold trading volume, the pricing server 102 may be configured to determine the market-dynamic security price from a different subset of the pricing data. If, for example, the determined trading volume did exceed the threshold trading volume, the pricing server 102 may be configured to determine the market-dynamic security price for stock AAAA as/from the midpoint between the most-recent bid and ask price quotes for stock AAAA from the pricing data.

The determination of whether or not the trading volume of stock AAAA exceeds a threshold may change over time and may be dependent on a time at which the determination is made. For example, for the given time period T described in the example above, the trading volume of stock AAAA was 50 trades and the trading volume threshold was 60 trades. However, in another time period T+15 which represents a time period 15 seconds later than time period T, the trading volume of stock AAAA may rise to 65 trades. In such a scenario and with the trading volume threshold still at 60 trades, the determination made for time periods T and T+15 of whether the trading volume of stock AAAA exceeds the threshold are different. For time period T, the trading volume of stock AAAA did not exceed the threshold trading volume; however, for time period T+15 the trading volume did exceed the threshold trade volume. Therefore, the market-dynamic security price for stock AAAA for time period T may be determined using the last actual trade price for stock AAAA, and the market-dynamic security price for stock AAAA for time period T+15 may be determined using the midpoint of bid and ask price quotes. Of course using the last actual trade price and the midpoint of bid and ask price quotes are for exemplary purposes only. Numerous other data from the pricing data may be used, such as for example, any bid, any ask, any last, midpoint of any bid and any ask, weighted prices, and/or matrix pricing, as well as data based on the data from the pricing data (e.g., data that is rounded, scaled, combined, or otherwise manipulated and/or altered based on the pricing data).

In at least one embodiment, in addition to or instead of comparing the determined trading volume to a threshold trading volume, the determined trading volume is compared to a trading volume of another given time period and based on the output of the comparison, the pricing server 102 is configured to determine a market-dynamic security price from different subsets of the pricing data.

For example, the pricing server 102 may be configured to use the last actual trade price for stock AAAA for determining a market-dynamic security price for a particular time period until the determined trading volume of stock AAAA for the current time period exceeds the determined trading volume of stock AAAA for the previous time period. If for example, time period T is the initial time period for which the pricing server 102 is determining a market-dynamic security price for stock AAAA, the pricing server 102 may be configured to use the last actual trade price for stock AAAA as a default. After time advances to the next time period for which the market-dynamic security price is to be determined, because the determined trading volume of stock AAAA for the current time period (in this example, the first time period after the initial time period) is 65 trades and the determined trading volume of stock AAAA for the previous time period (in this example, the initial time period) is 50 trades, the pricing server 102 is configured to determine the market-dynamic security price for the current time period using the midpoint of bid and ask price quotes.

Similar techniques as those described for determining a market-dynamic security price for stock AAAA may be used to determine respective market-dynamic security prices for stocks BBBB, CCCC, and DDDD.

Alternatively, the determined trading volume for one or more securities (e.g., stock AAAA) may be used to determine a market-dynamic security price for that security (e.g., AAAA), for some securities (e.g., AAAA and BBBB; or BBBB and DDDD) or all of the securities of the plurality of securities (e.g., AAAA, BBBB, CCCC, and DDDD).

To determine a trading volume from the pricing data, the pricing server 102 may be configured to analyze the pricing data corresponding to a security (or securities) of interest over a period of time and may be configured to calculate a number of trades of the security (or securities) of interest over the period of time. For example, to determine, from the pricing data, a trading volume over the last week for a stock having an example symbol ABCD (stock ABCD), the pricing data can be analyzed over the last week to determine the number of trades made of stock ABCD. Alternative, trading volume may be included in the pricing data from the exchange 108. In this scenario, the pricing server 102 is configured to determine the trading volume by identifying the trading volume data from the pricing data received from the exchange 108.

Another example market-feed metric that may be determined from the pricing data is price movement. Price movement may include price velocity. Generally, price velocity is a speed at which a price moves over time. In at least one embodiment, a price movement is determined from the pricing data for each of the portfolio securities of the plurality of portfolio securities. For example, the pricing server 102 may be configured to determine a price movement from the pricing data for each of the portfolio securities of the plurality of portfolio securities. Alternatively, a price movement may be determined from the pricing data for a subset of the portfolio securities of the plurality of portfolio securities.

To determine a price movement from the pricing data, the pricing server 102 may be configured to analyze the pricing data corresponding to a security (or securities) of interest over a period of time by determining whether an actual security trade price and/or a quoted price for the security (or securities) of interest has increased, decreased, stayed constant, increased to/above a threshold, and/or decreased to/below a threshold, among numerous other possibilities. For example, to determine, from the pricing data, a price movement for a particular time period for a stock having an example symbol EEEE (stock EEEE), the pricing data can be analyzed at/over a time period to determine whether an actual security trade price of EEEE and/or of a quoted price for the stock EEEE has changed over that time. Continuing with this example, suppose that the pricing data indicates that stock EEEE has been traded over the last 6 hours at high values of $19.25 (time T−6 hours), $19.40 (time T−5 hours), $19.65 (time T−4 hours), $19.52 (time T−3 hours), $19.78 (time T−2 hours), $20.03 (time T−1 hour) and $20.01 (current time T). The example pricing data indicates that the actually traded highest price of stock EEEE increased by $0.15 from time T−6 to time T−5, increased by $0.25 from time T−5 to time T−4, decreased by $0.13 from time T−4 to time T−3, increased by $0.16 from time T−3 to time T−2, increased by $0.25 from time T−2, to time T−1, and decreased by $0.02 from time T−1 to current time T.

In this example, the pricing server 102 is configured to determine a market-dynamic security price for a time interval including current time T. The pricing server 102 is configured to analyze the pricing data to determine whether the actually traded highest price of stock EEEE has decreased over the last hour, and based on determining that the actually-traded highest price of stock EEEE has decreased over the last hour, the pricing server 102 may be configured to determine the market-dynamic security price for stock EEEE in a first manner and/or otherwise, the pricing server 102 may be configured to determine the market-dynamic security price for stock EEEE in another manner.

For example, the pricing server 102 may be configured to determine the market-dynamic security price for stock EEEE by scaling the actually traded highest price of stock EEEE for the current time T by a first scaling value if the pricing server 102 determines that the actually traded highest price for stock EEEE has decreased over the last hour. Otherwise, the pricing server 102 may be configured to determine the market-dynamic security price for stock EEEE by scaling the actually traded highest price of stock EEEE for the current time T by a second scaling value that is different than the first scaling value. The first scaling value and/or the second scaling value may be random, pseudo-random, and/or predetermined.

In this example, the pricing server 102 determines that over the last hour, the actually traded highest price of stock EEEE has decreased and has done so by $0.02. Because the actually traded highest price of stock EEEE has decreased over the last hour, the pricing server is configured to determine the market-dynamic security price for stock EEEE for a time interval including current time T by scaling the actually traded highest price of stock EEEE for current time T by a predetermined scaling value. For example, the actually traded highest price of stock EEEE for the current time T, which is $20.01, may be scaled by a predetermined scaling value of 0.999, resulting in a market-dynamic security price for stock EEEE of $19.99 (rounded to 2 decimal places). Of course, the predetermined scaling value of 0.999 is used only for exemplary purposes and numerous other scaling values may be used.

In at least one embodiment, the pricing server 102 is configured to determine the market-dynamic security price is determined by switching between the bid, the ask, the average, and the book-weighted average. The switching may occur between time intervals in a predetermined order (e.g., cyclical), a random order, or a pseudo-random order. To determine the book-weighted average, the pricing data can be analyzed by taking the volume-weighted ask and volume-weighted bid (i.e., the total volume at and above the ask times the ask averaged with total volume at and below the bid times the bid). This will give a number that lies between the bid and the ask based on total book volume.

In at least one embodiment, the market-dynamic security price is determined by randomly altering a rounding operation.

As another example, the market-dynamic security price may be determined by determining a plurality of valid prices for each security (at least a high and a low valid price) and determining an aggregate IIV high and low, and then selecting a price in that range as the market-dynamic security price. For a subsequent time interval, determining a new high and low and if the old price is in that new range, then just repeat the old price.

As another example, the market-dynamic security price may be determined by determining a high negative or positive velocity (magnitude above a threshold) then using the bid or ask, respectively, and otherwise using the mid-point. A trade reported on a security from within that interval may be picked. If there are no trades then we use a weighting scheme (mid-point, book-volume weighted mid-point).

As another example, a trade made within a current pricing interval may be selected. Once a price is set, that begins a new pricing interval, at the end of which we publish a new price.

Another example market-feed metric that may be determined from the pricing data is index movement. In at least one embodiment, the pricing server 102 is configured to analyze the pricing data to determine index movement, and based on the determined index movement, the pricing server 102 selects a particular subset of the pricing data to determine the market-dynamic security price. For example, an index movement may be determined from the pricing data, and based on the determined index movement, a market-dynamic security price may be determined for each of the portfolio securities of the plurality of portfolio securities. Alternatively, based on the determined index movement, a market-dynamic security price may be determined from the pricing data for a subset of the portfolio securities of the plurality of portfolio securities.

For example, the pricing data may be analyzed to determine that a particular index (e.g., the S&P 500 index) has increased, decreased, increased to/above a threshold value, decreased to/below a threshold value, and/or stayed constant over some period of time. Based on this determined index movement, the subset of pricing data from which the market-dynamic security price for a stock is determined may be selected. For example, the pricing server 102 may be configured to analyze the pricing data to determine whether the S&P 500 index has increased over some time period (e.g., the last week). In this example, if the pricing server 102 determines that the trade price of the S&P 500 index has increased over the last trading week, the pricing server is configured to use the most-recent bid price for stock FFFF from the pricing data to determine the market-dynamic security price for stock FFFF, otherwise the pricing server 102 is configured to use the most-recent ask price for stock FFFF from the pricing data to determine the market-dynamic security price for stock FFFF.

Another example market-feed metric that may be determined from the pricing data is market movement. In at least one embodiment, the pricing server 102 is configured to determine a market movement from the pricing data. For example, the pricing server 102 may be configured to analyze market-specific data from the pricing data. The market-specific data may correspond to one or more given markets (e.g., technology, financial, etc.). Based on the determined market movement, the pricing server 102 may select a particular subset of the pricing data to determine the market-dynamic security price.

Another example market-feed metric that may be determined from the pricing data is derivative movement. In at least one embodiment, the CIV includes one or more derivatives. In at least one embodiment, the pricing server 102 is configured to analyze the pricing data to determine derivative movement of one or more of the derivatives that may be included in the CIV. Based on the determined derivative movement, the pricing server 102 may be configured to select a particular subset of the pricing data from which the pricing server 102 determines the market-dynamic security price of one or more securities of the CIV.

Another example market-feed metric that may be determined from the pricing data is market momentum. Generally, market momentum is an indication of a market's strength in maintaining an increase or decrease in one or more prices. Market momentum can be a function of both price change during a time period as well as the trading volume during that time period. In at least one embodiment, the pricing server 102 is configured to determine a market momentum from the pricing data for a given time period. Based on the determined market momentum, the pricing server 102 may be configured to determine a market-dynamic security price.

In at least one embodiment, the calculated IIV is verified prior to and/or post dissemination. For example, a first IIV may be calculated as described above using a first pricing data feed (e.g., a first independent pricing source) and a second IIV may be calculated as described above using a second pricing data feed (e.g., a second independent pricing source). The first calculated IIV and the second calculated IIV may be compared and, if the two calculated IIV's are within a predetermined difference, then an average of the two calculated IIVs may be disseminated and/or may be verified as accurate. If the first calculated IIV and the second calculated IIV are not within a predetermined difference, then at least one IIV may be recalculated using one or more different market metrics and/or over one or more different time periods.

In at least one embodiment, the pricing server 102 generates an intraday indicative value (IIV) of a CIV share based on the determined market-dynamic security prices. For example, after determining a market-dynamic security price for each of the securities in the CIV, the pricing server 102 may be configured to apply the securities respective weights to the corresponding security's determined market-dynamic security price, such weighted security prices may be summed, the sum may be divided by the amount of shares per creation unit (CU) of the CIV and then any estimated cash value divided by the amount of shares per CU of the CIV.

In at least one embodiment, the pricing server 102 is configured to transmit the indicative value of the CIV share for publication. The indicative value determined at the pricing server 102 may be transmitted for publication by one or more exchanges, websites, etc.

An example architecture of the pricing server 102 is discussed below in connection with FIG. 2.

Figure 2:
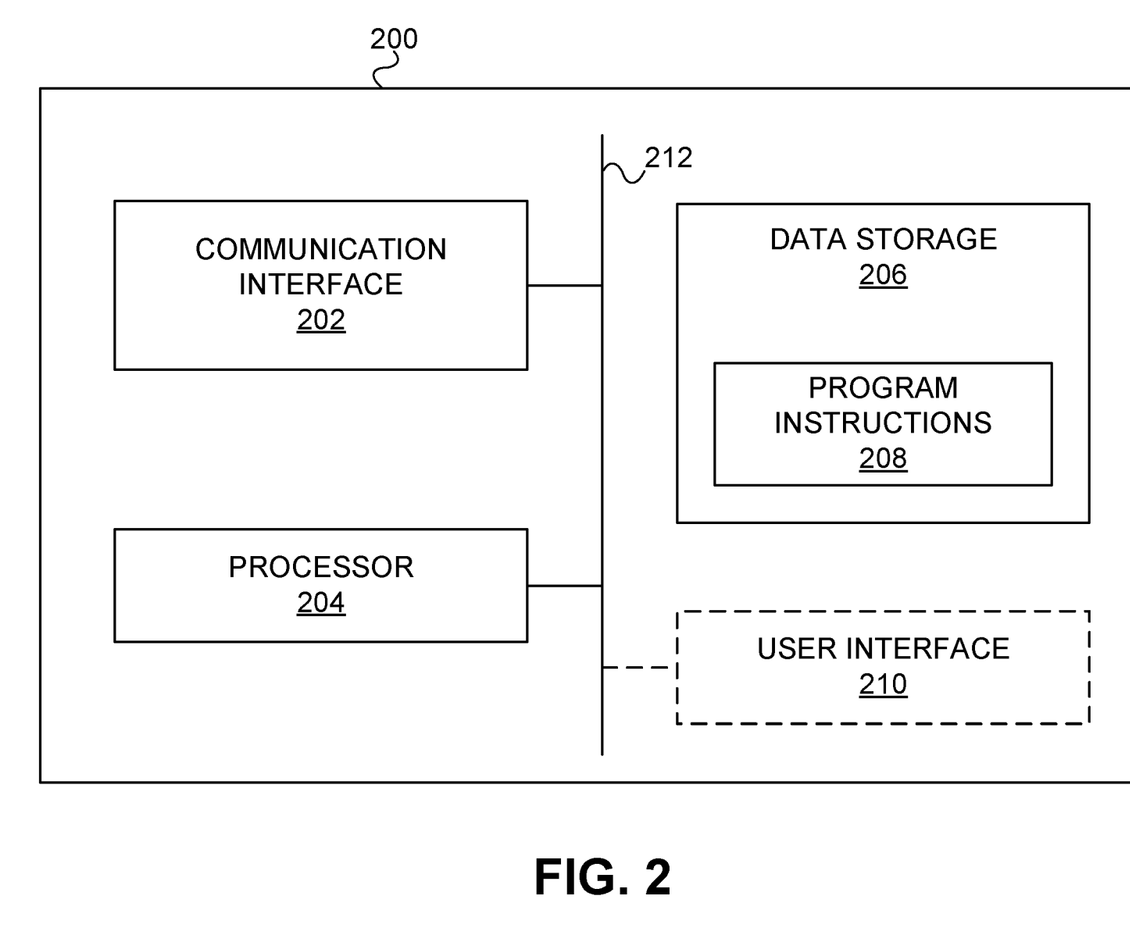
FIG. 2 depicts an example architecture of an example server, in accordance with at least one embodiment.

FIG. 2 depicts an example architecture of an example server 200, in accordance with at least one embodiment. In particular, FIG. 2 depicts an example architecture of a representative server 200, which could represent the pricing server 102, the CIV server 104 or any other server deemed suitable by those of skill in the art for a particular implementation.

As depicted in the example of FIG. 2, the server 200 includes a communication interface 202, a processor 204, and data storage 206, all of which are communicatively connected by a system bus 208. The structure of the server 200 that is presented in FIG. 2 is by way of example and not limitation, as other structures could be utilized as well or instead in different implementations. In some instances, the server 200 may also include an optional user interface 210.

The communication interface 202 may include one or more wireless-communication interfaces (for communicating according to, e.g., LTE, Wi-Fi, Bluetooth, and/or the like) and/or one or more wired-communication interfaces (for communicating according to, e.g., Ethernet, USB, and/or the like). As such, the communication interface 202 may include any necessary hardware (e.g., chipsets, antennas, Ethernet cards, etc.), any necessary firmware, and any necessary software for conducting one or more forms of communication with one or more other entities as described herein.

The processor 204 may include one or more processors of any type deemed suitable by those of skill in the relevant art, some examples including a general-purpose microprocessor and a dedicated digital signal processor (DSP).

The data storage 206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. The data storage 206 contains program instructions 210 that are executable by the processor 204 for carrying out various functions described herein.

In the present disclosure, various elements of one or more of the described embodiments are referred to as "modules" that carry out (i.e., perform, execute, and the like) various functions described herein. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

Figure 3:
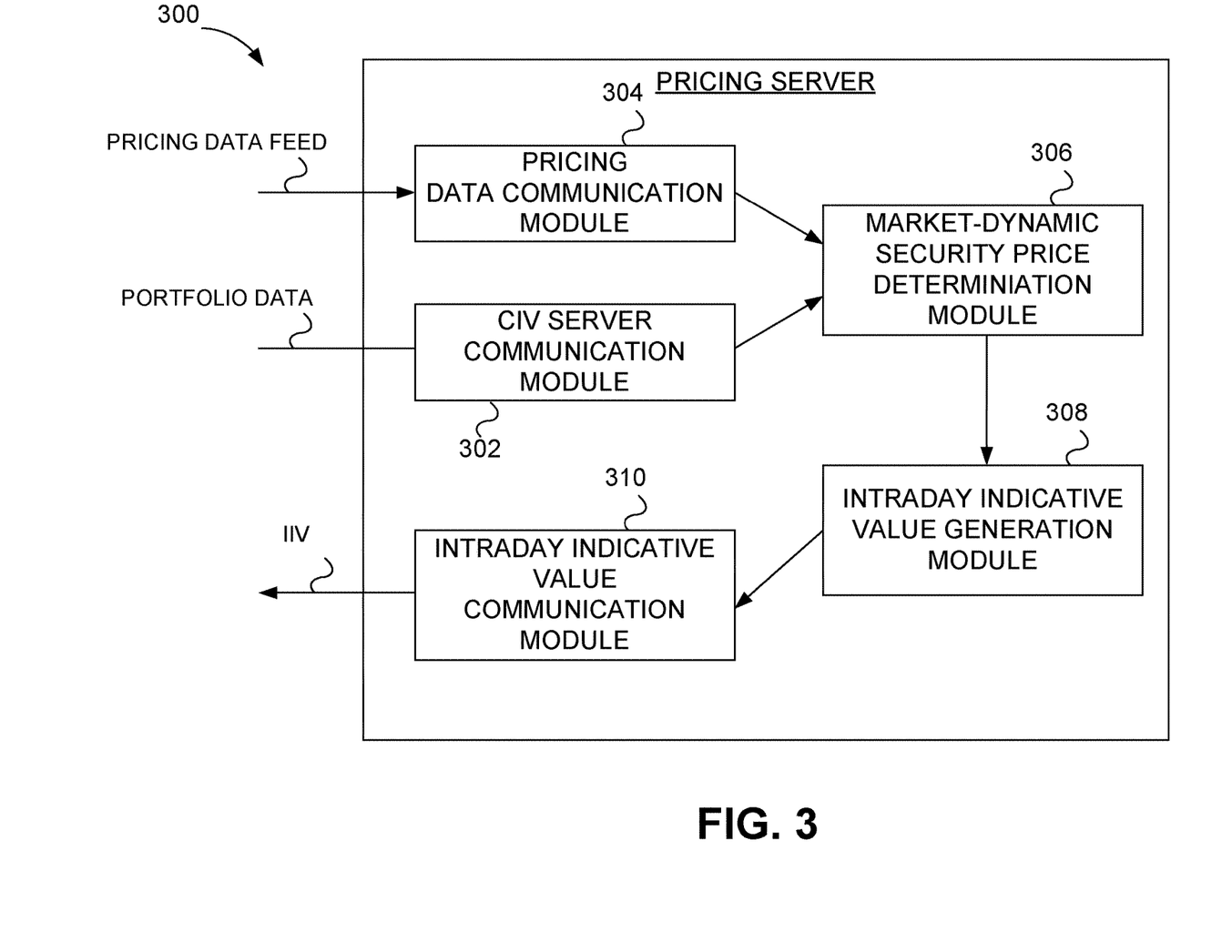
FIG. 3 depicts an example architecture of an example pricing server, in accordance with at least one embodiment.

FIG. 3 depicts an example architecture of an example pricing server 300. The example pricing server 300 includes a CIV server communication module 302, a pricing data communication module 304, a market-dynamic security price determination module 306, an intraday indicative value generation module 308, and an intraday indicative value communication module 310.

In at least one embodiment, the CIV server communication module 302 is configured to receive portfolio-composition data that identifies a plurality of portfolio securities of a CIV. For example, the CIV server communication module 302 may be configured to receive portfolio-composition data transmitted from a CIV server such as the CIV server 104 from FIG. 1. The CIV server communication module 302 may be configured to, for example, request that a CIV server provide portfolio-composition data or the CIV server communication module 302 may be configured to, for example, automatically receive portfolio-composition (e.g., after the closing of the prior trading day and prior to the opening of the current trading day).

In at least one embodiment, the pricing data communication module 304 is configured to obtain pricing data. For example, the pricing data communication module 304 may be configured to obtain pricing data from one or more exchanges, such as for example, exchange 108 of FIG. 1.

In at least one embodiment, the market-dynamic security price determination module 306 is configured to determine a market-dynamic security price for each portfolio security of the plurality of portfolio securities, wherein the market-dynamic security price is dependent at least in part upon one or more market-feed metrics determined from the pricing data. For example, the market-dynamic security price determination module 306 may be configured to communicate with the CIV server communication module 302 and the pricing data communication module 304 to identify one or more subsets of the pricing data corresponding to one or more securities of the CIV. The market-dynamic security price determination module 306 may be further configured to communicate determined market-dynamic security prices to the intraday indicative value generation module 308.

In at least one embodiment, the intraday indicative value generation module 308 is configured to an indicative value of a CIV share based on the determined market-dynamic security prices. The intraday indicative value generation module 308 may further be configured to communicate the generated indicative value to the intraday indicative value communication module 310.

In at least one embodiment, the intraday indicative value communication module 310 is configured to transmit the indicative value for publication.

Figure 4:
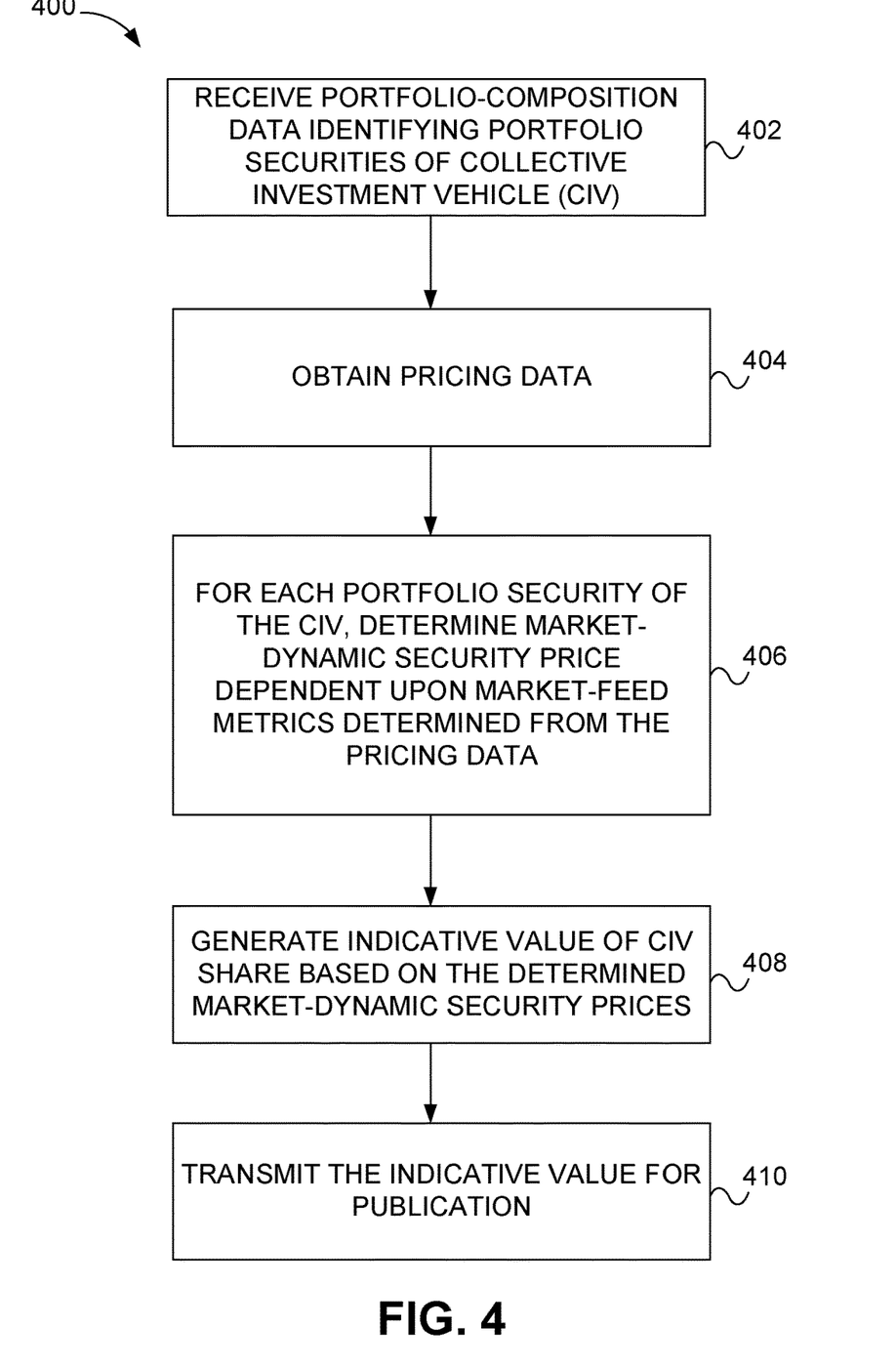
FIG. 4 depicts an example method, in accordance with at least one embodiment.

FIG. 4 depicts an example method, in accordance with at least one embodiment.

At step 402, the pricing server 102 receives portfolio-composition data that identifies a plurality of portfolio securities of a CIV. For example, the pricing server 102 may receive the portfolio-composition data from the CIV server 104 which may be stored in the portfolio data database 106. In at least one embodiment, the portfolio-composition data is received from the CIV server 104.

At step 404, the pricing server 102 obtains pricing data. In at least one embodiment, the pricing data is received from the exchange 108.

At step 406, the pricing server 102 determines a market-dynamic security price for each portfolio security of the plurality of portfolio securities. In this example method, the market-dynamic security price is dependent at least in part upon one or more market-feed metrics that are determined from the pricing data.

At step 408, the pricing server 102 generates an indicative value of a CIV share based on the determined market-dynamic prices.

At step 410, the indicative value of the CIV share is transmitted for publication.

Figure 5:
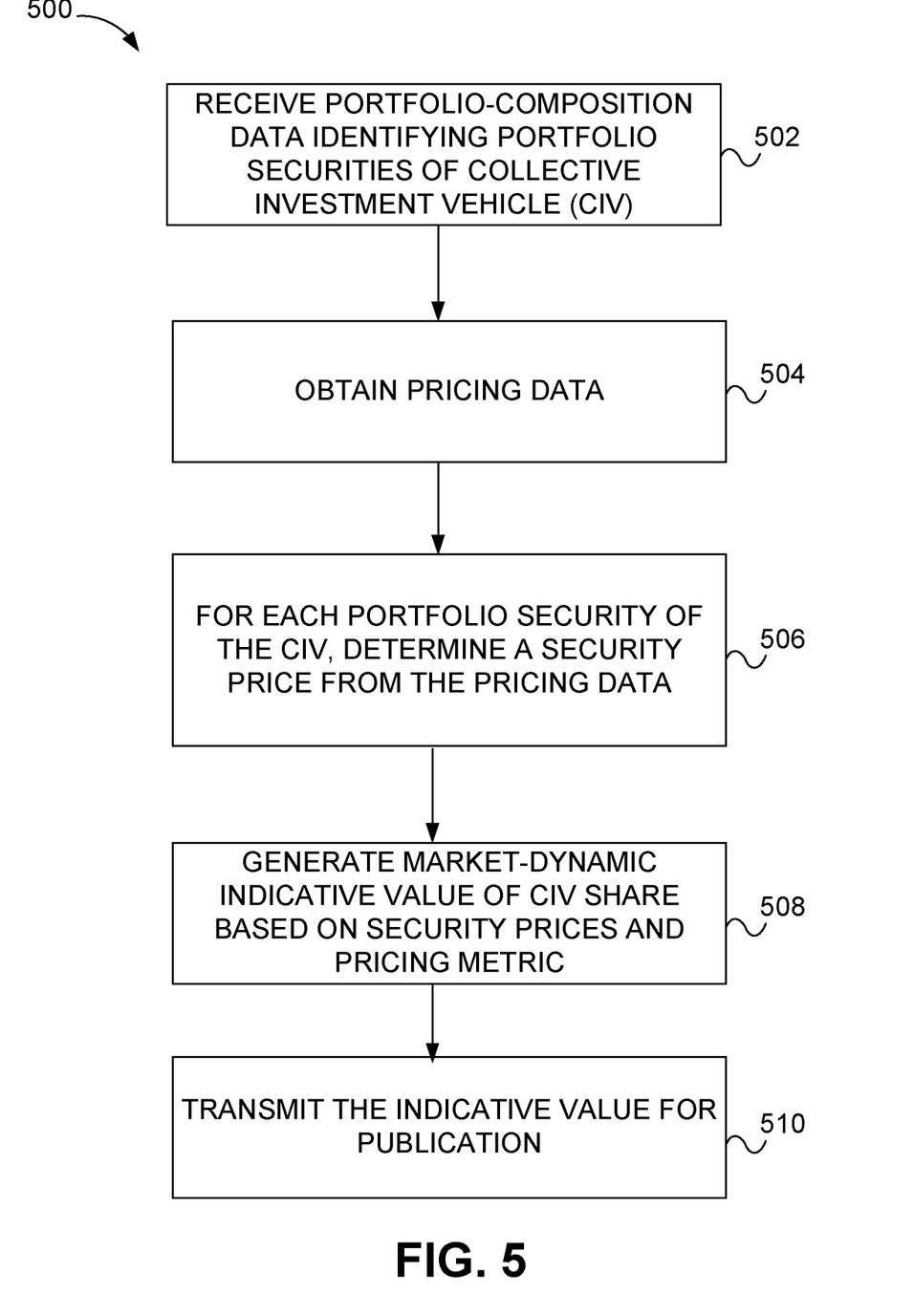
FIG. 5 depicts another example method, in accordance with at least one embodiment.

FIG. 5 depicts an example method, in accordance with at least one embodiment.

At step 502, the pricing server 102 receives portfolio-composition data that identifies a plurality of portfolio securities of a CIV. For example, the pricing server 102 may receive the portfolio-composition data from the CIV server 104 which may be stored in the portfolio data database 106. In at least one embodiment, the portfolio-composition data is received from the CIV server 104.

At step 504, the pricing server 102 obtains pricing data. In at least one embodiment, the pricing data is received from the exchange 108.

At step 506, the pricing server 102 determines a security price for each portfolio security of the plurality of portfolio securities. Each security price may be determined from the pricing data by selecting from the pricing data a bid price, an ask price, a last price, and/or a midpoint between an ask price and an ask price.

At step 508, the pricing server 102 generates a market-dynamic indicative value of a CIV share based on the determined prices and based on one or more market-feed metrics. Alternatively, the pricing server 102 generates an indicative value of a CIV share based on the determined prices and is modified to a random or predetermined resolution.

At step 510, the market-dynamic indicative value of the CIV share is transmitted for publication.

Figure 6:
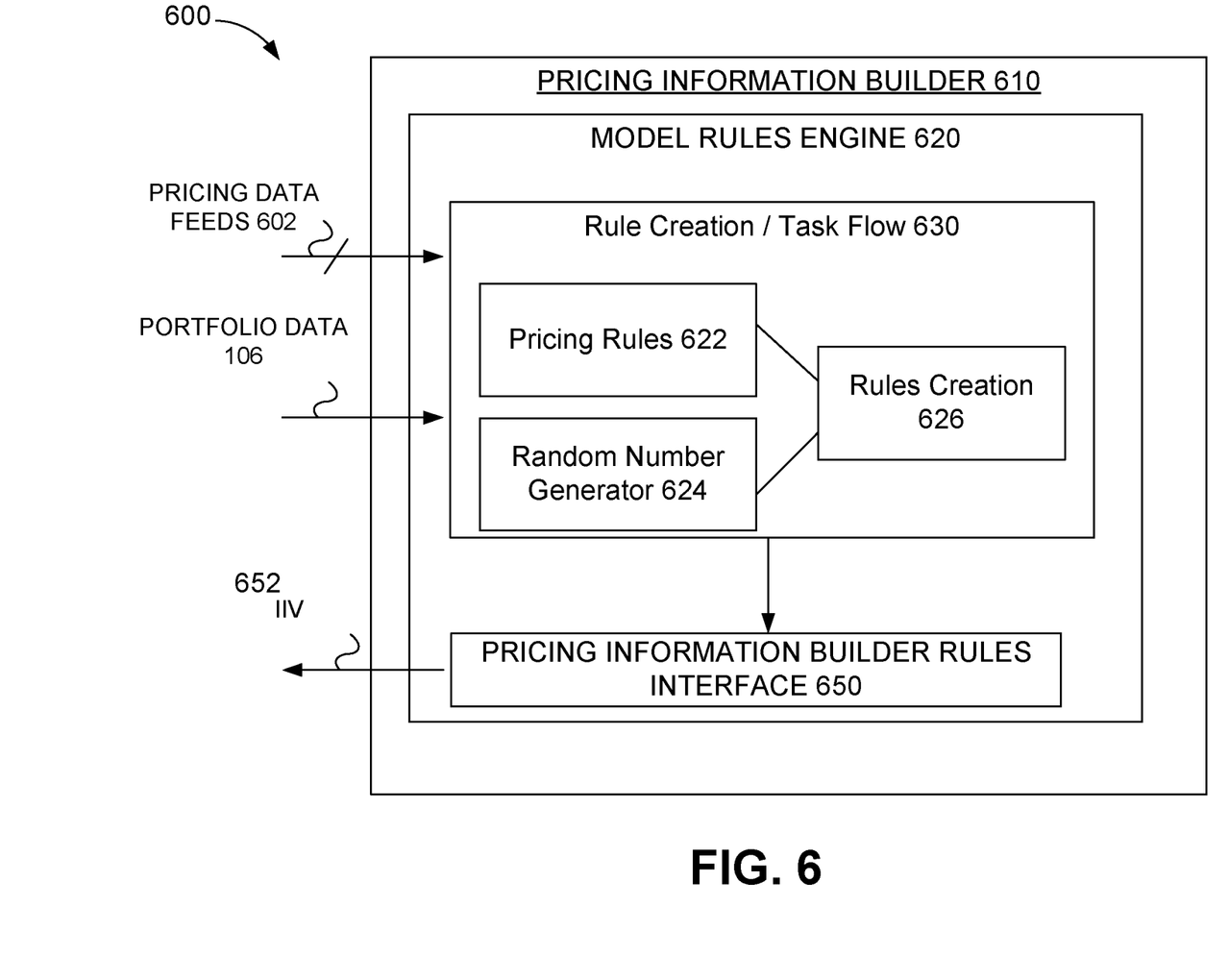
FIG. 6 depicts an example architecture of an example price information builder in accordance with an embodiment.

Referring now to FIG. 6, a block diagram depicts an example system architecture 600 that illustrates a pricing information builder (PIB) 610.

As shown in FIG. 6, a PIB 610 includes a Model Rules Engine 620. Within the Model Rules Engine 620, an application task flow/Rule Creation 630 may include flows for operations related to pricing securities and manages pricing data and information to be transmitted outside of an application created by Model Rules Engine 620. Model Rules Engine 620 may access database information through a data model that defines the data model for an application. More specifically, task flows 630 defined for the application manages pricing data that can be edited with PIB 610. In one embodiment, metadata is stored in a database and passed to PIB 610 to model the pricing rules via pricing rules 622. Thus, facts and functions from standard pricing rules and updated pricing rules can be accessed. PIB 610 can also include APIs to provide access to pricing rules, pricing attributions, functions and actions that are available to the Model Rules Engine 620. Thus depending on the pricing rules, and the user requirements, PIB 610 can be accessed through APIs and interfaces to access various internal and external data providers and rule evaluation engines according to the needs of the context of the pricing required. For example, in one embodiment, Model Rules Engine 620 lists available objects, conditions and actions defined by metadata concerning pricing that can be translated into code for the rules dictionary formed via Rules Creation 626 and support a pricing application created using PIB 610.

In one embodiment, the interface includes a pricing attribute list that allows a user to edit price parameters. A price parameters with special conditions with Boolean values, data types, strings that are accessible or defined, constraints for allowable actions may be defined in the metadata for PIB 600. In one embodiment, rules actions can be set to a preset parameter. Thus, for example, conditions may include "equal to" "not equal to" at least "less than" "not exceeding" and the like.

According to one embodiment, pricing rules are driven by rules action interfaces. For example, in one embodiment receives a request to launch PIB 610 by a user, enables a user to interact with the PIB 610 to build pricing rules. For example, at pricing server 300, the user can access model rule engine 620. For example, if pricing is more dependent on randomization of pricing, the rules will have attributes and function with particular rules condition interfaces, and rules actions associated with an application that defines options and parameters based on the pricing task. The resulting application be tailored to the relevant pricing needs via candidate rule models.

In one embodiment, pricing server 102 includes or can be coupled to receive data from a PIB 610 that can be included as part of a pricing server 102, for example as part of a price generator module such as market-dynamic security price determination module 306 or intraday indicative value generation module 308 such as market-dynamic security price determination module and/or intraday indicative value generation module 308.

In an embodiment, Pricing Information Builder (PIB) 610 can be implemented as an Applications Programming Interface, or a user interface for determining pricing rules or as an interface to generate proposed intraday indicative values for use by pricing server 300. Thus, the PIB 610 can be implemented as user interface 210 shown in FIG. 3. In one embodiment, PIB 610 can provide an additional layer for modules described above, such as modules 302, 304, 306, 308 and 310 and provide another level of abstraction to support pricing decision making by pricing server 300.

As shown in FIG. 6, PIB 610 includes a model rules engine 620 that can include Rule Creation/Task Flow 630 configured to determine which rules apply to determine proposed intraday indicative values (IIVs). Rule Creation/Task Flow 630 is coupled to receive pricing data feeds 602 that can include data fees from one or more exchanges that provide the same or different security pricing data. Rule Creation/Task Flow 630 can also receive portfolio data 108 as described above representing pricing data concerning portfolios of interest.

Within Rule Creation/Task Flow 630, block 622 includes pricing rules 622 and random number generator 624. Pricing rules 622 can include objects capable of accesses APIs, objects and access to databases that enable pricing rules to apply to the pricing data and portfolio data. Random number generator can include pseudo-random number generators and sequence generators that can apply pre-determined time sequences in a pseudo-random fashion or in a partially random fashion, as determined in accordance with the pricing rules 622. The output from Rule Creation/Task Flow 630 is provided to Pricing Information Builder Rules Interface 650, which provides an intraday indicative value, which can be output as an API, to a user interface provided as a proposed IIV or transmitted as needed in accordance with system requirements.

Figure 7:
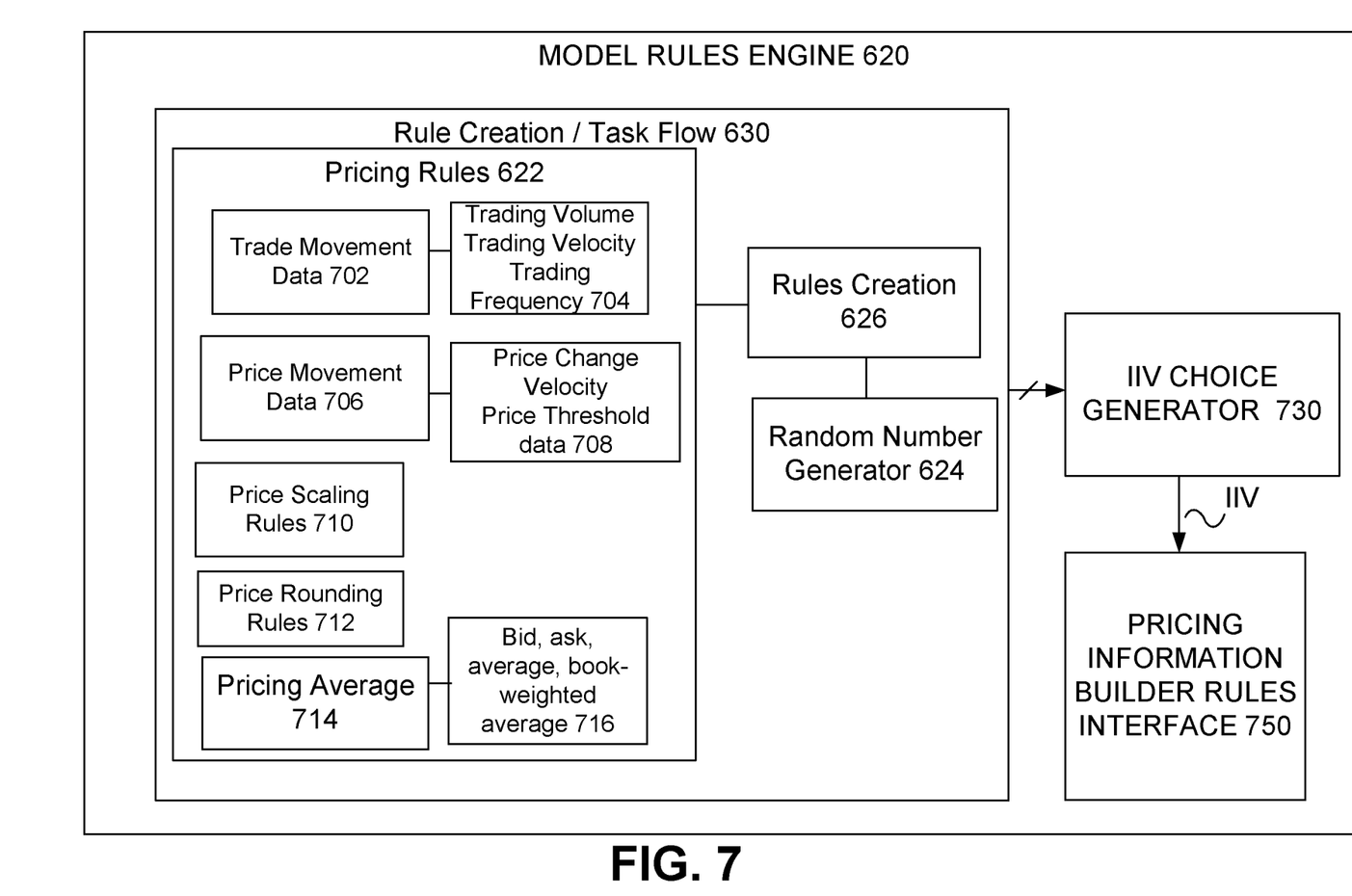
FIG. 7 depicts a model rules engine showing further detail of the example architecture of FIG. 6 in accordance with an embodiment.

Referring now to FIG. 7, an embodiment for Model Rules Engine 620 illustrates further detail. Model Rules Engine 620 can be implemented with pricing rules 622 that can be coupled to APIs, databases and data feeds (as shown in FIG. 6) and include objects such as trade movement data 702 coupled to send and receive information related to securities pricing that can be calculated based on received data from outside pricing rules 622 to determine trading volume, trading velocity and trading frequency data 704. Another object shown in pricing rules 622 includes price movement data 706 shown coupled to send and receive information related to securities price change velocity data and securities price threshold data 708. Another object shown in pricing rules 622 includes pricing average object 714 which is coupled to send and receive information related to bid, ask, average, and book-weighted average data for securities. Other objects shown include price scaling rules 710 and price rounding rules 712.

Objects shown in pricing rules 622 can be provided to Rules Creation 626 to store identified rules and metadata.

In one embodiment, the output from pricing rules 622 includes multiple intraday investment vehicle (IIV) prices to IIV Choice Generator 730. In one embodiment, IIV Choice Generator 730 includes a random number processor to identify an IIV appropriate for providing to Pricing Information Builder Rules Interface 750. In another embodiment, IIV Choice Generator 730 determines an IIV from a plurality of IIVs provided by performing an averaging calculation, as described above with respect to averaged prices from different sources and calculations.

Figure 8:
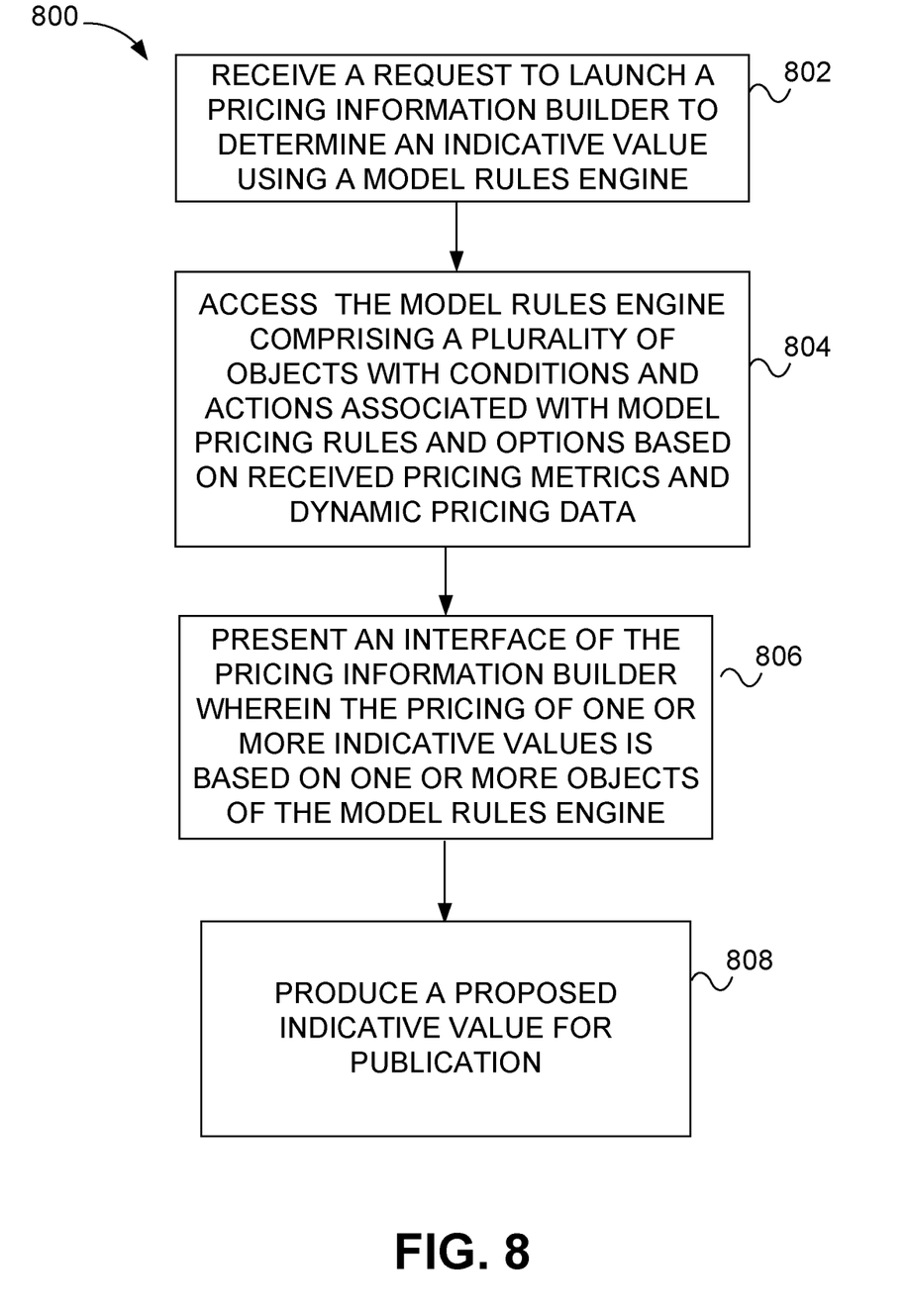
FIG. 8 depicts an example method in accordance with an embodiment

Referring now to FIG. 8 in combination with FIGS. 6 and 7, a method in accordance with an embodiment includes step 802, receiving a request to launch a pricing information builder to determine an indicative value using a model rules engine. For example, a user or the pricing server 300 via, for example, an API, can request that PIB 610 determine an indicative value using model rules engine 620.

Step 804 provides for accessing Model Rules Engine 620, wherein Model Rules Engine 620 comprises a plurality of objects with conditions and actions associated with model pricing rules and options based on received pricing metrics and dynamic pricing data. For example, the pricing rules 622 can include a plurality of objects with conditions and actions related to pricing based on pricing data feeds 602 and portfolio data 108. In one embodiment, the plurality of objects are associated with the Model Rules Engine 620 defining one or more options related to pricing, and one or more dynamic inputs related to a plurality of portfolio securities of a collective investment vehicle (CIV). For example, options can be related to data fed from exchanges and the like and dynamic calculations based on the securities pricing received from exchanges.

In another embodiment, the plurality of objects shown in Model Rules Engine 620 can access metadata defining one or more rules by applying one or more of the parameters of conditions and actions to reach an action. For example, parameters of conditions and actions can include methodologies for reaching different calculations regarding trading movement data, price movement data, price averaging data and the like.

Step 806 provides for presenting an interface of the Pricing Information Builder (PIB) 610 wherein the pricing of one or more indicative values is based on one or more objects of the Model Rules Engine 620. For example, referring to FIG. 7, an embodiment of Model Rules Engine 620 is shown that includes pricing rules 622 and a plurality of objects with conditions and actions. As shown pricing rules 622 can include trade movement data 702 coupled to trading volume, trading velocity, and trading frequency 804 as an object. Pricing rules 622 further includes price movement data 706 coupled to price change velocity and price threshold data 708. Pricing rules 622 can also include price scaling rules 710, price rounding rules 712, and pricing average 714 coupled to bid, ask, average, and book-weighted average 716.

Step 808 provides for producing a proposed indicative value for publication. For example, the proposed indicative value can be an intraday indicative value of a CIV for publication. In one embodiment, if the application built using PIB 610 successfully produces an IIV, a user can then implement the PIB 610 as a pricing application in accordance with embodiments described herein.

What is claimed is:

1. A method performed by a pricing server comprising a processor, intraday indicative value (IIV) communication processor, pricing data communication processor, market-dynamic security price determination processor, and a collective investment vehicle (CIV) server communication processor, wherein the market-dynamic security price determination processor further includes a Price Information Builder (PIB) comprising a PIB rules interface, the method comprising:

storing, by the market-dynamic security price determination processor, pricing rules within the PIB;

receiving, by the CIV server communication processor, portfolio composition data of a CIV from a CIV server over a first communication link, wherein the portfolio composition data comprises security identifiers and quantity information for each security identifier, for each security in the CIV;

receiving, by the pricing data communication processor, pricing data from an exchange over a second communication link; transmitting, by the processor, the portfolio composition data and pricing data to the PIB;

receiving, by the PIB, a request for an IIV of the CIV from the processor;

determining, by the PIB and from among the stored pricing rules within the PIB, a first set of pricing rules to apply to the pricing data and portfolio composition data in computing the IIV for the CIV;

determining, by the processor and for each security identifier, at least one metric based on the pricing rules and a market-dynamic security price based on the at least one metric;

receiving, by the PIB and from the processor, the at least one metric and the market-dynamic security price;

generating, by the PIB, the requested IIV based on the received at least one metric and the market-dynamic security price for each security identifier using the determined first set of pricing rules; and providing, by the PIB interface and via the processor, the generated IIV to a user interface.

2. The method of claim 1, wherein the pricing data includes a bid price and an ask price for each security identifier included in the portfolio composition data.

3. The method of claim 2, wherein the bid price is a highest bid price for each security identifier included in the portfolio composition data and the ask price is a lowest ask price for each security identifier included in the portfolio composition data.

4. The method of claim 1, wherein the pricing data includes, for each security identifier included in the portfolio composition data, a midpoint between a bid price and an ask price and a last actual traded price.

5. The method of claim 1, further comprising: determining, by the processor and for each security identifier, that the at least one metric for the CIV based on the pricing data.

6. The method of claim 1, further comprising: transmitting, by the IIV communication processor, the generated IIV to the exchange.

7. The method of claim 1, wherein determining the market-dynamic security price for each security identifier, comprises:
    selecting a first subset of the pricing data corresponding to a first pricing interval;
    selecting, based on the at least one metric, a second subset of the pricing data corresponding to a second pricing interval; and
    based on a comparison of the first subset of the pricing data to the second subset of the pricing data, using either a bid price, an ask price, a midpoint between a bid and ask price, or a last trade price to determine the market-dynamic security price for the security identifier.

8. The method of claim 7, wherein determining the market-dynamic security price for each security identifier, comprises scaling the selected first subset of the pricing data by a predetermined multiplier or divisor.

9. The method of claim 7, wherein determining the market-dynamic security price for each security identifier, comprises using a different pricing technique than a prior pricing interval.

10. The method of claim 1, wherein generating, by the PIB, the requested IIV comprises:
    generating, by the PIB, a plurality of IIV values for the CIV; and
    determining, by the PIB, a particular IIV based on the plurality of generated IIV values, wherein the particular IIV is the requested IIV.

11. The method of claim 10, wherein determining, by the PIB, the particular IIV based on the plurality of generated IIV values, comprises:
    selecting, using a random number processor of the PIB, the particular IIV from among the plurality of generated IIV values.

12. The method of claim 10, wherein determining, by the PIB, the particular IIV based on the plurality of generated IIV values, comprises:
    computing, by the PIB, an average of the plurality of generated IIV values to obtained the particular IIV.

13. The method of claim 1, wherein the pricing rules stored in the PIB include one or more of trade movement data, trading volume data, price movement data, and price rounding rules.

14. The method of claim 2, wherein generating the requested IIV comprises generating an unadjusted indicative value of a CIV share and rounding the unadjusted indicative value of the CIV share to a predetermined resolution.

15. The method of claim 2, wherein the pricing data include data for securities with characteristics corresponding to the security identifiers included among securities in the portfolio composition data.

16. The method of claim 3, wherein the characteristics specify prices that correspond to prices of the security identifiers.

* * * * *